United States Patent
Montero Bayo et al.

(10) Patent No.: US 12,388,547 B2
(45) Date of Patent: Aug. 12, 2025

(54) METHODS FOR USER EQUIPMENT FOR IMPROVING POSITION INFORMATION, APPARATUS, VEHICLE AND COMPUTER PROGRAM

(71) Applicant: VOLKSWAGEN AKTIENGESELLSCHAFT, Wolfsburg (DE)

(72) Inventors: Luca Montero Bayo, Barcelona (ES); Andreas Pfadler, Berlin (DE)

(73) Assignee: VOLKSWAGEN AKTIENGESELLSCHAFT (DE)

( * ) Notice: Subject to any disclaimer, the term of this patent is extended or adjusted under 35 U.S.C. 154(b) by 442 days.

(21) Appl. No.: 18/045,091

(22) Filed: Oct. 7, 2022

(65) Prior Publication Data
US 2023/0113523 A1    Apr. 13, 2023

(30) Foreign Application Priority Data
Oct. 7, 2021    (EP) ..................... 21201375

(51) Int. Cl.
*H04H 20/71*    (2008.01)
*H04H 60/70*    (2008.01)

(52) U.S. Cl.
CPC ............ *H04H 20/71* (2013.01); *H04H 60/70* (2013.01); *H04H 2201/13* (2013.01)

(58) Field of Classification Search
CPC ... H04W 52/225; H04W 48/02; H04W 48/12; H04W 68/00; H04W 68/005; H04W 74/0891; H04W 4/029; H04W 4/40; H04W 64/00; H04W 72/25; H04W 76/14
USPC ................. 370/310, 315, 312, 252, 390, 347
See application file for complete search history.

(56) References Cited

U.S. PATENT DOCUMENTS

| | | | |
|---|---|---|---|
| 8,565,791 B1 * | 10/2013 | Schilit ...................... | G01S 5/02 455/414.1 |
| 9,143,413 B1 * | 9/2015 | Manku ................ | H04M 15/846 |
| 9,538,334 B2 * | 1/2017 | Cawse .................. | H04W 4/027 |
| 10,098,014 B1 | 10/2018 | Shimizu et al. | |
| 10,551,479 B1 * | 2/2020 | Ylamurto ............ | H04L 43/0864 |
| 11,528,586 B2 * | 12/2022 | Tamanaha ............ | G01S 5/0221 |
| 2006/0171332 A1 * | 8/2006 | Barnum ................ | H04W 8/005 370/254 |
| 2019/0238658 A1 | 8/2019 | Shimizu et al. | |

(Continued)

FOREIGN PATENT DOCUMENTS

| | | |
|---|---|---|
| EP | 3471075 A1 | 4/2019 |
| EP | 3687082 A1 | 7/2020 |
| WO | 2022051615 A1 | 3/2022 |

OTHER PUBLICATIONS

Extended European Search Report; European Patent Application No. 21201375.9; Mar. 30, 2022.

*Primary Examiner* — Joseph Arevalo
(74) *Attorney, Agent, or Firm* — BARNES & THORNBURG LLP (57) ABSTRACT

A method for user equipment to improve position information of one or more communication devices including obtaining map information about positions of the one or more communication devices, determining radio channel information about the one or more communication devices by analyzing a radio channel, and generating a node map having improved position information of the one or more communication devices using the map information and the radio channel information.

24 Claims, 2 Drawing Sheets

(56) References Cited

U.S. PATENT DOCUMENTS

2020/0142051 A1\* 5/2020 Anderson ............. G01S 13/867
2022/0377648 A1\* 11/2022 Wang ................ H04W 74/0891

\* cited by examiner

METHODS FOR USER EQUIPMENT FOR IMPROVING POSITION INFORMATION, APPARATUS, VEHICLE AND COMPUTER PROGRAM

PRIORITY CLAIM

This patent application claims priority to European Patent Application No. 21201375.9, filed 7 Oct. 2021, the disclosure of which is incorporated herein by reference in its entirety.

SUMMARY

Illustrative embodiments relate to the field of wireless communication. Illustrative embodiments further relate to methods for user equipment for improving position information, an apparatus, a transportation vehicle and a computer program, more particularly, but not exclusively, to a concept for improving position information of one or more communication devices, e.g., to improve a node map.

BRIEF DESCRIPTION OF THE DRAWINGS

Disclosed embodiments will be described below with reference to the accompanying figures, in which.

DETAILED DESCRIPTION

The development of 5G has brought increased attention to the automotive industry as a vertical manufacturer expected to leverage the most advanced features of the new generation of wireless communications. Among the main novelties of 5G, a wide range of spectrum possibilities (currently licensed up to the 28 GHz band—the first-ever Millimeter wave band for mobile use), enhanced support for high mobility scenarios and new mechanisms to guarantee and predict the experienced Quality of Service (QoS), have been established as key functions to support an increasingly connected transportation ecosystem. Besides, the latest standard release (Rel. 16) has given support to Vehicle-to-Everything (V2X) communications with New Radio (NR) technology, allegedly allowing transportation vehicles to make use of the same spectrum options, even for Vehicle-to-Vehicle (V2V) use cases.

Providing the NR support of V2X, transportation vehicles are also capable of communicating at frequencies above 6 GHz. In 5G, these higher frequency bands are allocated at the mmWave range of the spectrum (30-300 GHz). The use of higher frequency bands in communications implies propagating in a harsher channel, where the free-space path loss scales with ($f^2$), and shading by obstacles and atmospheric effects (i.e., water vapor and oxygen absorption, or rain) take a non-negligible role. Services relying on higher frequency systems, with their inherently high channel-induced attenuation, might find challenging to deliver satisfactory QoS in some situations where signal power attenuation is increased, lowering the received Signal-to-Noise Ratio. As a result, 5G User Equipment (UE) is reliant on multi-antenna front ends to perform beamforming and focus the radiate power towards the intended transmitter/receiver. It is thus worth considering that transportation vehicles may be equipped with an advanced multi-antenna system.

Users (e.g., V2X nodes) aiming to communicate with their surrounding nodes at these bands might not be able to easily identify all the users given the directive nature of the links. These nodes may be reached by a directive beam.

EP 3 471 075 A1 reveals a method for collision avoidance between a vulnerable road user transportation vehicle and a surrounding transportation vehicle. Such vulnerable road user transportation vehicle may be a bicycle, motorcycle, scooter, roller or the like. The method comprises transferring position detecting sensor data or derived position data of the vulnerable road user transportation vehicle to a portable communication device used by the user of the vulnerable road user. The portable communication device performs a map matching technique for refining the position data and transfers the refined position data to the vulnerable road user transportation vehicle. Hence the vulnerable road user transportation vehicle performs an operation of distributing the refined position data to the surrounding transportation vehicles, which will calculate a trajectory for the vulnerable road user transportation vehicle and estimate if there is a risk of a collision.

U.S. Pat. No. 10,098,014 B1 reveals a beam alignment based on driving intentions. A method includes receiving a wireless message that includes first transportation vehicle data that describes a first transportation vehicle position, a first vehicle speed, a first transportation vehicle heading, and a first transportation vehicle driving intention. The method further includes determining whether a block age is predicted to occur based on a second transportation vehicle position, a second transportation vehicle driving intention, and the first transportation vehicle data. The method further includes, responsive to the blockage being predicted to occur, determining a non-line of sight path based on the second transportation vehicle position, the second transportation vehicle driving intention, and the first transportation vehicle data. The method further includes before the blockage is predicted to occur, performing beam alignment between the first transportation vehicle and the second transportation vehicle based on the NLOS path.

EP 3 687 082 A1 reveals modifying a vehicle-to-everything (V2X) radio of a first endpoint based on beam alignment feedback data. A method for the first endpoint includes detecting an intention of the first endpoint to exchange a first millimeter wave (mmWave) message with a second endpoint. The method includes determining scenario data describing a scenario of one or more of the first endpoint and the second endpoint. The method includes requesting a recommended beam alignment setting from a connected computing device based on the scenario data. The method includes receiving feedback data describing the recommended beam alignment setting from the connected computing device. The method includes modifying an operation of the V2X radio of the first endpoint based on the recommended beam alignment setting so that the V2X radio of the first endpoint exchanges the mmWave message with the second endpoint using the recommended beam alignment setting.

V2X nodes may constantly monitor their surroundings in search for hazards or unusual situations. It is foreseen that V2X nodes will pro-actively attempt to prevent their own hazardous situation with the received V2X data, as well as share information (sensor data, identified hazards, etc.) with other surrounding V2X nodes for them to do the same, for the purpose of getting a collective perception of the environment to make roads safer.

However, it is likely that communications at high frequency bands (such as the mmWave band) will be unicast/groupcast based, where the data will be addressed to specific V2X nodes and beam training will be done between nodes to maximize performance. Given the inherently directivity of these links, transmitting V2X nodes might not have a full picture of the nodes that a message is to be addressed to. This is important, for example, if a hazard is detected in a region and safety-critical data needs to be transmitted to the susceptible transportation vehicles in the neighboring area. Thus, there may be a need to improve a V2X node discovery, especially at high frequency bands.

It is therefore a finding that an improved determination of position information may allow user equipment to generate a node map with improved position information. Inefficient periodically updates can then be reduced. For example, a V2X node may have a full picture of the nodes that a message is to be addressed to. That way, a communication between different user equipment, e.g., two different V2X nodes (e.g., two different transportation vehicles) can be improved, since e.g., beamforming for communication between both user equipment can be improved.

Examples provide a method for a communication device for improving position information of one or more communication devices. The method comprises obtaining map information about positions of the one or more communication devices and determining radio channel information about the one or more communication devices by analyzing a radio channel. Further, the method comprises generating a node map comprising improved position information of the one or more communication devices using the map information and the radio channel information. Thus, the node map can be used e.g., for adjusting a transmission parameter (e.g., beam width, angle of departure, angle of arrival, etc.), which may increase a communication between the user equipment and the one or more communication devices.

In an example, the radio channel information may be a spatial radio channel information belonging to an antenna system of the user equipment. Thus, the radio channel information can be determined by the user equipment in an eased way utilizing the antenna system. For example, the radio channel information may be determined during normal operation of the antenna system of the user equipment.

In an example, the method may further comprise transmitting the generated node map to further user equipment. Thus, the further user equipment can be enabled to use the node map without generating it. This way the further equipment can e.g., adjust transmission parameter (e.g., beam width, angle of departure, angle of arrival, etc.), which may increase a communication between the further user equipment and the one or more communication devices.

In an example, the method may further comprise transmitting the radio channel information to further user equipment. Thus, the further user equipment can use the radio channel information provided by the user equipment to generate a further node map. This way a data traffic between the user equipment and the further user equipment can be reduced, still enabling an increased communication between the further user equipment and the one or more communication devices.

In an example, the generated node map and/or the radio channel information may be transmitted by a broadcast message. Thus, the node map and/or the radio channel information can be received by multiple communication devices, e.g., by a V2X node not connected to the user equipment.

In an example, the method may further comprise determining the radio channel information periodically and determining the node map periodically based on the periodically determined radio channel information. Thus, the node map can be periodically updated which may increase a communication between the further user equipment and the one or more communication devices, since it can be adjusted in time.

In an example, the method may further comprise receiving further radio channel information from further user equipment and editing the node map comprising the one or more communication devices using the further radio channel information. Thus, the user equipment can improve the node map using the further radio channel information.

Examples relates to a method for further user equipment for improving position information of one or more communication devices. The method comprises obtaining map information about positions of the one or more communication devices and receiving radio channel information about the one or more communication devices from user equipment. Further, the method comprises generating a node map comprising improved position information of the one or more communication devices using the map information and the radio channel information. Thus, the further user equipment can use the radio channel information provided by the user equipment to generate a further node map. This way the communication between the further user equipment and the one or more communication devices can be improved without requiring the further user equipment to determine the radio channel information.

In an example, receiving another radio channel information from another user equipment and editing the node map comprising the one or more communication devices using the other radio channel information. Thus, the further user equipment can improve the node map using the other radio channel information.

In an example, the method may further comprise transmitting a request for the radio channel information and/or the other radio channel information. Thus, the further user equipment can request the radio channel information and/or the other radio channel information to generate the node map.

In an example, the method may further comprise transmitting the generated node map to the user equipment and/or the other user equipment. Thus, the user equipment and/or the other user equipment can be enabled to use the node map without generating it.

In an example, the generated node map, the radio channel information and/or the other radio channel information is transmitted by a broadcast message. Thus, the node map, the radio channel information and/or the other radio map information can be received by multiple communication devices, e.g., by a V2X node not connected to the further user equipment.

Examples further provide an apparatus, comprising one or more interfaces configured to communicate with a communication device or user equipment. The apparatus further comprises processing circuitry configured to control the one or more interfaces and to perform the method for user equipment and/or a communication device described above.

Examples further provide a transportation vehicle comprising the apparatus as described above.

Examples further relate to a computer program having a program code for performing the method described above, when the computer program is executed on a computer, a processor, or a programmable hardware component.

Some examples are now described in more detail with reference to the enclosed figures. However, other possible examples are not limited to the features of these embodiments described in detail. Other examples may include modifications of the features as well as equivalents and alternatives to the features. Furthermore, the terminology used herein to describe certain examples should not be restrictive of further possible examples.

Throughout the description of the figures same or similar reference numerals refer to same or similar elements and/or features, which may be identical or implemented in a modified form while providing the same or a similar function. The thickness of lines, layers and/or areas in the figures may also be exaggerated for clarification.

When two elements A and B are combined using an 'or', this is to be understood as disclosing all possible combinations, i.e., only A, only B as well as A and B, unless expressly defined otherwise in the individual case. As an alternative wording for the same combinations, "at least one of A and B" or "A and/or B" may be used. This applies equivalently to combinations of more than two elements.

If a singular form, such as "a", "an" and "the" is used and the use of only a single element is not defined as mandatory either explicitly or implicitly, further examples may also use several elements to implement the same function. If a function is described below as implemented using multiple elements, further examples may implement the same function using a single element or a single processing entity. It is further understood that the terms "include", "including", "comprise" and/or "comprising", when used, describe the presence of the specified features, integers, operations, processes, elements, components and/or a group thereof, but do not exclude the presence or addition of one or more other features, integers, operations, processes, elements, components and/or a group thereof.

Figure 1:
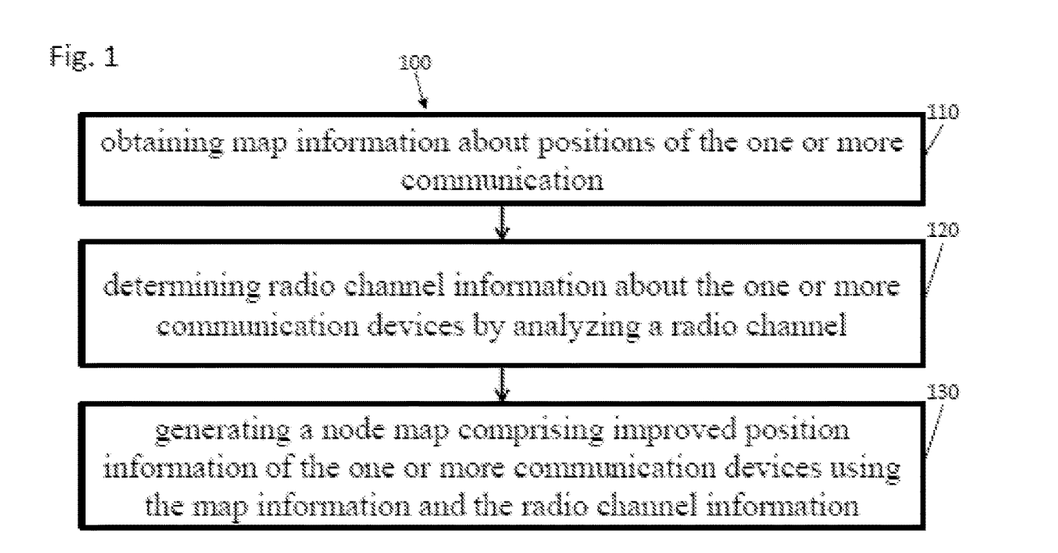
FIG. 1 shows an example of a disclosed method for user equipment.

FIG. 1 shows an example of a method 100 for user equipment. The method 100 for the user equipment is for improving position information of one or more communication devices. The method 100 comprises obtaining 110 map information about positions of the one or more communication devices and determining 120 radio channel information about the one or more communication devices by analyzing a radio channel. Further, the method 100 comprises generating 130 a node map comprising improved position information of the one or more communication devices using the map information and the radio channel information. Thus, the node map can be used by the UE to communicate with the one or more communication devices, which may improve a reliability of the communication, since the position information the one or more communication devices is improved.

The UE may communicate in a mobile communication system with the one or more communication device, e.g., a base station. For example, the UE and the one or more communication devices may communicate in/via a mobile communication system. The mobile communication system may comprise a plurality of transmission points and/or base stations operable to communicate radio signals with the UE. In an example, the mobile communication system may comprise the UE and the one or more communication device.

A communication device, e.g., the one or more communication device, can be located in the fixed or stationary part of the network or system. A communication device may correspond to a remote radio head, a transmission point, an access point, a macro cell, a small cell, a micro cell, a pico cell, a femto cell, a metro cell etc. The term small cell may refer to any cell smaller than a macro cell, i.e., a micro cell, a pico cell, a femto cell, or a metro cell. Moreover, a femto cell is considered smaller than a pico cell, which is considered smaller than a micro cell. A communication device can be a wireless interface of a wired network, which enables transmission and reception of radio signals to a UE, such as a UE, or UE. Such a radio signal may comply with radio signals as, for example, standardized by 3GPP or, generally, in line with one or more of the above listed systems. Thus, a communication device may correspond to a NodeB, an eNodeB, a BTS, an access point, etc.

The mobile communication system may be cellular. The term cell refers to a coverage area of radio services provided by a transmission point, a remote unit, a remote head, a remote radio head, communication device, UE or a NodeB, an eNodeB, respectively. The terms cell and base station may be used synonymously. A wireless communication device, e.g., the UE, can be registered or associated with at least one cell (e.g., the communication device), i.e., it can be associated to a cell such that data can be exchanged between the network and the mobile in the coverage area of the associated cell using a dedicated channel, connection or connection.

In general, the UE is a device that is capable of communicating wirelessly. In particular, however, the UE may be a mobile UE, i.e., a UE that is suitable for being carried around by a user. For example, the UE may be a User Terminal (UT) or User Equipment (UE) within the meaning of the respective communication standards being used for mobile communication. For example, the UE may be a mobile phone, such as a smartphone, or another type of mobile communication device, such as a smartwatch, a laptop computer, a tablet computer, or autonomous augmented-reality glasses. For example, the UE and the one or more communication devices may be configured to communicate in a cellular mobile communication system/ cellular mobile communication system. Accordingly the UE and the communication device may be configured to communicate in a cellular mobile communication system, for example, in a Sub-6 GHz-based cellular mobile communication system (covering frequency bands between 500 MHz and 6 GHz) or in a mmWave-based cellular mobile communication system (covering frequency bands between 20 GHz and 60 GHz). In general, the mobile communication system may, for example, correspond to one of the Third Generation Partnership Project (3GPP)-standardized mobile communication networks, where the term mobile communication system is used synonymously to mobile communication network. The mobile communication system may correspond to, for example, a 5th Generation system (5G), a Long-Term Evolution (LTE), an LTE-Advanced (LTE-A), High Speed Packet Access (HSPA), a Universal Mobile Telecommunication System (UMTS) or a UMTS Terrestrial Radio Access Network (UTRAN), an evolved-UTRAN (e-UTRAN), a Global System for Mobile communication (GSM) or Enhanced Data rates for GSM Evolution (EDGE) network, a GSM/EDGE Radio Access Network (GERAN), or mobile communication networks with different standards, for example, a Worldwide Inter-operability for Microwave Access (WIMAX) network IEEE 802.16, generally an Orthogonal Frequency Division Multiple Access (OFDMA) network, a Time Division Multiple Access (TDMA) network, a Code Division Multiple Access (CDMA) network, a Wideband-CDMA (WCDMA) network, a Frequency Division Multiple Access (FDMA) network, a Spatial Division Multiple Access (SDMA) network, etc.

In addition the UE/one or more communication devices may be suitable for, or configured to, communicating/communicate via non-cellular communication systems, e.g., via a device-to-device vehicular communication system, e.g., according to the IEEE 802.11p standard (Institute of Electrical and Electronics Engineers standard 802.11p for vehicular communication) or via a wireless local area network (e.g., according to IEEE 802.11a, IEEE 802.11b, IEEE 802.11g, IEEE 802.11n, IEEE 802.11ac or IEEE 802.11ax, also known as Wi-Fi 1 through Wi-Fi 6(E)). In particular, the UE and the one or more communication devices may be suitable for, or configured to, communicating/communicate in the frequency band between 5 GHz and 7.1 GHz, which covers communication in the 5 GHz band (for WiFi in the 5 GHz band), 5.9 GHz band (for vehicular communication according to the 802.11p standard) and between 5.9 GHz and 7.1 GHz (for WiFi in the 6 GHz band).

A connection between the UE and the one or more communication devices may be a wireless connection, e.g., a mmWave-based connection over the mobile communication system (e.g., using carrier frequencies of at least 20 GHz) or may be performed at lower carrier frequencies, e.g., using carrier frequencies of at most 7.5 GHz. For example, the wireless connection between the UE and the one or more communication devices may be initiated using the protocols of the mobile communication system, or using a short-range communication system, such as via a wireless local area network outlined above.

As is evident from the above example, while the communication between UE and one or more communication devices occurs via the mobile communication system, additional communication and/or alternatively communication (e.g., the one or more communication devices may be a transportation vehicle) between the UE and the one or more communication devices may occur via a vehicular communication system. Such communication may be carried out directly, e.g., by Device-to-Device (D2D) communication. Such communication may be carried out using the specifications of the vehicular communication system. An example of D2D is direct communication between transportation vehicles, also referred to as Vehicle-to-Vehicle communication (V2V) or Vehicle-to-Everything (V2X), car-to-car, Dedicated Short Range Communication (DSRC), respectively. Technologies enabling such D2D-communication include 802.11p, 3GPP systems (4G, 5G, NR and beyond), etc.

Obtaining 110 the map information can be done at least partially in advance, e.g., by downloading/loading a map. Thus, the positions of the one or more communication devices may be given by the map. The map can comprise position information about the one or more communication devices independently from a position of the UE and/or the map can comprise information about a line-of-sight condition between the UE and the one or more communication devices (e.g., a line-of-sight map).

For example, the UE may download a map and may combine position information of the one or more communication device with the radio channel information. Optionally or alternatively, the UE may obtain the map information in real-time, e.g., by a measurement or receive real-time measurement data. For example, the UE (e.g., a transportation vehicle) may use a wide variety of on-board sensor data types, including radar sensor data and lidar sensor data, but also, e.g., vision-related sensors such as camera and IR sensors, as well as ultrasound sensors to determine the positions of the communication devices. Optionally or alternatively, the UE may receive the (real-time) map information from another UE or a base station in the environment of the UE. For example, the UE may receive the map information by e.g., cooperate awareness message, decentralized environmental notification message, collective perception message, etc.

The radio channel information may correspond to a transmission parameter of the radio channel, a usage of the radio channel depending on a position of the UE, an availability of the radio channel depending on a position of the UE, a radio access technology, a mobile system communication provider, etc. Determining 120 the radio channel information may be performed e.g., by determining a setting of an antenna system of the UE and/or by determining if a communication using the radio channel is possible. For example, the UE may sense no communication device in an (line-of-sight) area of its environment. This way, the UE can determine that there may be no communication device in this area and if in the map information a (misleading) communication device of the one or more communication devices is located in this area, the UE may generate the node map by deleting the (misleading) communication device from the map information in this area.

Optionally or alternatively, the UE may sense a communication device at a first position using an antenna system setting and the map information may indicate no communication device at the first position, but a (misplaced) communication device close to the first position. Thus, the UE may generate the node map by assigning the first position to this (misplaced) communication device.

Generating 130 the node map can be performed by a processing circuitry of the UE. For generating 130 the node map a weighting of the map information and the radio channel information can be used. For example, the radio channel information, e.g., a position information determined using the radio channel information, can be prioritized over the map information. This way if the map information and the radio channel information provide contradictive position information of the one or more communication devices the node map may comprise only position information of the one or more communication device which match the radio channel information.

Alternatively, the radio channel information may be used to indicate a reliability of the position of the one or more communication devices extracted from the map information. For example, if the radio channel information matches the map information of a communication device the position of this communication device can be indicated as reliable and if the map information contradicts the radio channel information the position of this communication device can be indicated as unreliable. This way a usage of the node map may be improved since reliable nodes can be identified. Alternatively, the map information can be used to indicate a reliability of the position of the one or more communication devices extracted from the radio channel information (just like in the context of the reverse example described above).

The improved position information can be, e.g., a corrected position of the one or more communication device and/or a position information extracted from the map information improved by an indication of a reliability of this position information provided by the radio channel information (and vice versa).

In an example, the radio channel information may be a spatial radio channel information belonging to an antenna system of the user equipment. Thus, the radio channel information may comprise position information of the one or more communication device, which can be used to improve the position information of the one or more communication devices.

For example, the antenna system of the UE may be configured to receive signals under a fixed angle of arrival. Thus, be knowing the angle of arrival the UE can determine a position information based on a received radio signal. Optionally or alternatively, the UE may determine a position information based on a signal intensity. For example, by combining information about a spatial direction of a radio signal and a signal strength the exact position of a transmitter, e.g., the one or more communication devices, can be determined by the UE. Thus, the improved position information of the one or more communication devices can be determined by the combination of the position information extracted from the map information and extracted from the radio channel information. This way the position information of the one or more communication devices can be increased.

In an example, the method may further comprise transmitting the generated node map to further user equipment. Thus, the further UE can determine a position of the one or more communication devices in an improved way using the node map.

In an example, the method may further comprise transmitting the radio channel information to further user equipment. Thus, the further UE can determine the node map in an improved way. For example, the UE may sense different one or more communication devices as the further UE due to a different position (and concluding different line-of-sight condition). By transmitting the radio channel information, the further UE may generate or edit the node map using the further radio channel information, which may improve a reliability of the node map.

In an example, the generated node map and/or the radio channel information may be transmitted by a broadcast message. Thus, the node map and/or the radio channel information can be shared in an easy way with other communication devices in the communication system, e.g., with the further UE.

In an example, the method may further comprise determining the radio channel information periodically and determining the node map periodically based on the periodically determined radio channel information. Thus, the node map can be updated periodically. For example, the one or more communication device may be mobile, e.g., a communication device may be a transportation vehicle acting as relay system to establish a connection between the UE and a base station. For example, the transportation vehicle may offer relaying service, e.g., based on a line-of-sight map. Thus, the UE may use the transportation vehicle as relay system and may use the periodically determined radio channel information to determine whether the transportation vehicle is still at the same position or not. For example, if the UE may sense a movement of the transportation vehicle the UE may edit the node map based on the movement of the transportation vehicle. Thus, the UE may generate/edit the node map in a way, that the node map is dynamical and comprises information about a predicted position of the one or more communication devices.

In an example, the method may further comprise receiving further radio channel information from further user equipment and editing the node map comprising the one or more communication devices using the further radio channel information. Thus, the UE can edit the node map based on e.g., line-of-sight information of the further equipment, since the further UE may sense different one or more communication devices as the UE.

To perform the method 100 a transportation vehicle may comprise the user equipment. The UE may be equipped with a connectivity system (CS) to deal with V2X communications. This CS is equipped with an antenna system (AS) with one or more panels, each facing different radiating directions and composed of one or more antenna elements, fed by a digitally controlled analog feeding network.

For example, the transportation vehicle may obtain the map information by receiving node maps from other V2X nodes, e.g., the one or more communication devices, customary V2X messaging (e.g., cooperate awareness message, decentralized environmental notification message, collective perception message), use of sensor data (e.g., radar, lidar, cameras), etc.

For example, the radio channel information may be determined by an angle of arrival of the received messages associated to the node and/or an antenna array location. Further, the transportation vehicle may also add information such as intention data of a received or predicted trajectory, to consider the future position of the one or more communication devices.

The map information and the radio channel information may be merged by data fusion by the UE to improve position information of the one or more communication devices. The improved position information may be used to generate the node map, which may be locally stored by the UE. This node map can be updated by a trigger event, e.g., by a reception of new map information, determination of new radio channel information, etc. and/or periodically e.g., using a fixed time period independent from the node map obtaining or the radio channel information determination.

Further, the UE may periodically or non-periodically broadcast the generated node map. Thus, the further UE may be enabled to use the generated node map. Also the further UE may perform the generation of a further node map based on the node map and further radio channel information (e.g., determined by the further UE).

For example, the node map may be broadcasted via sub-6 GHz V2X bands to extend the spread of the data.

The V2X communication, e.g., between the UE and the one or more communication devices may be Wireless Local Area Network (WLAN) technology and works directly between vehicle and vehicle (V2V) and/or traffic infrastructure (V2I), which form a vehicular ad-hoc network as two V2X senders come within each other's range. Messages like Cooperative Awareness Messages (CAM) or Basic Safety Message (BSM), and Decentralized Environmental Notification Messages (DENM) may be used for communication between the transportation vehicles. Other roadside infrastructure related messages are Signal Phase and Timing Message (SPAT), in Vehicle Information Message (IVI), and Service Request Message (SRM).

In case of aiming to establish a link with the one or more (discovered) communication devices, the UE may make an initial guess of the configuration of the antenna system to define a beam strategy (such as a reduced beamset for beamsweep, beamwidth, Angle of Departure, antenna weights, etc.) to transmit the signal. This initial guess might be based on a relative position, predicted/intended trajectory of both transmitting and receiving nodes, angle of arrival, etc.

The communication that occurs before connection establishment, and that may be used to obtain the information, may be based on broadcasts of the UE, e.g., via the mobile communication system. Accordingly, the UE may be suitable for, or configured to, communicate in/via the one or more communication devices. For example, the UE, and, in particular, the one or more communication devices may be configured to communicate via one or more antennas via the mobile communication system. Additionally, the UE, and the one or more communication devices, may be configured to communicate via short-range communication, e.g., via a wireless local area network according to an alternative of the IEEE 802.11 standard, via BLUETOOTH® or via UWB.

More details and facets are mentioned in connection with the embodiments described above and/or below. The example shown in FIG. 1 may comprise one or more optional additional features corresponding to one or more properties mentioned in connection with the proposed concept or one or more examples described below (e.g., FIG. 2-3).

Figure 2:
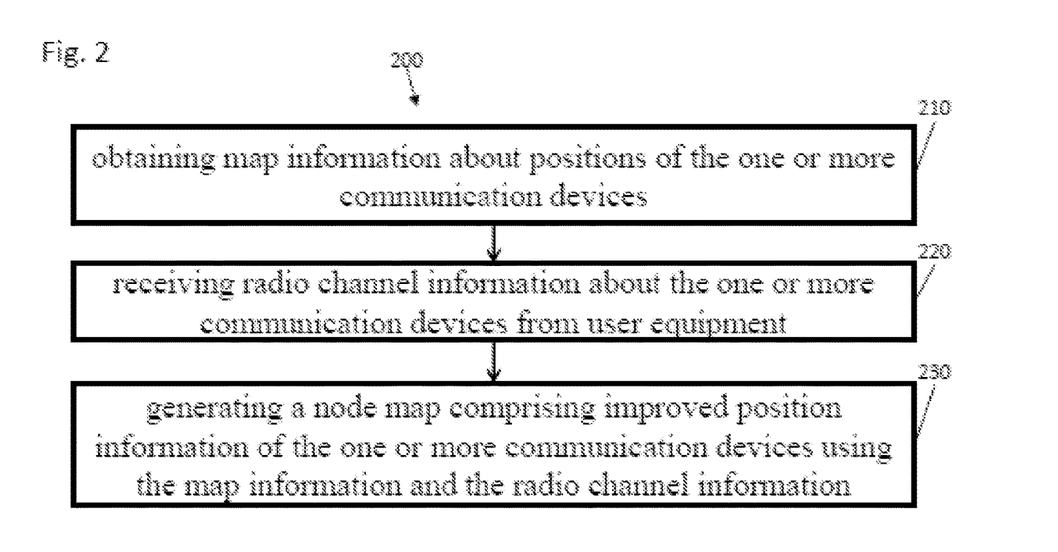
FIG. 2 shows an example of a disclosed method for further user equipment.

FIG. 2 shows another example of a method 200 for a further user equipment. The method 200 for the user equipment is for improving position information of one or more communication devices. The method comprises obtaining 210 map information about positions of the one or more communication devices and receiving 220 radio channel information about the one or more communication devices from user equipment. Further, the method 200 comprises generating 230 a node map comprising improved position information of the one or more communication devices using the map information and the radio channel information. Thus, the further UE can be enabled to generate the node map comprising the improved position information without determining the radio channel information. As described above, the radio channel information may comprise information about one or more communication devices which the further UE cannot sense. Thus, the determination of the node map can be improved.

In an example, the method 200 may further comprise receiving another radio channel information from another user equipment and editing the node map comprising the one or more communication devices using the other radio channel information. Thus, the node map may be improved based on the further radio channel information, which may comprise information about one or more communication devices not comprised by the radio channel information. Further, an error in determining the position information based on the radio channel information can be reduced by using the further position information, since redundancy may occur, and a reliability of the determined position information may be improved.

In an example, the method 200 may further comprise transmitting a request for the radio channel information and/or the other radio channel information. Thus, the further UE can request the information required for improving the position information, e.g., after a connection to a node determined by the map information has been failed. This way the further UE can adaptively generate the node map if a problem arises.

In an example, the method 200 may further comprise transmitting the generated node map to the user equipment and/or the other user equipment. Thus, the user equipment and/or the other user equipment can also the use generated node map.

In an example, the generated node map, the radio channel information and/or the other radio channel information is transmitted by a broadcast message. Thus, the node map, the radio channel information and/or the other radio map information can be received by multiple communication devices, e.g., by a V2X node not connected to the further user equipment.

More details and facets are mentioned in connection with the embodiments described above and/or below. The example shown in FIG. 2 may comprise one or more optional additional features corresponding to one or more features mentioned in connection with the proposed concept or one or more examples described above (FIG. 1) and/or below (e.g., FIG. 3).

Figure 3:
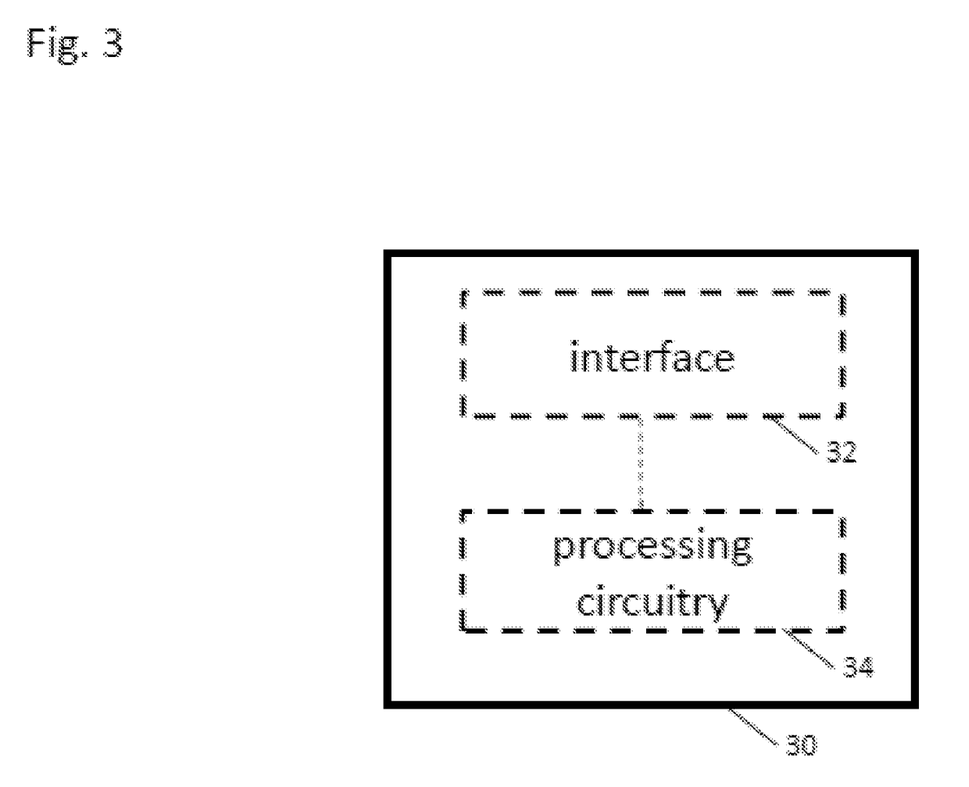
FIG. 3 shows a block diagram of a disclosed apparatus.

FIG. 3 shows a block diagram of an apparatus 30. The apparatus 30 comprises one or more interfaces 32 configured to communicate with a communication device or user equipment. The apparatus 30 further comprises processing circuitry 34 configured to control the one or more interfaces and to perform the method for a communication device as described above (e.g., described with reference to FIGS. 1-2). The apparatus 30 may be comprised by a transportation vehicle. For example, the transportation vehicle may be a land vehicle, such a road vehicle, a car, an automobile, an off-road vehicle, a motor vehicle, a bus, a robo-taxi, a van, a truck or a lorry. Alternatively, the transportation vehicle may be any other type of vehicle, such as a train, a subway train, a boat or a ship. For example, the proposed concept may be applied to public transportation (trains, bus) and future method or mechanism of mobility (e.g., robo-taxis).

For example, the apparatus 30 can be the communication device, where the interface is configured to communicate with the other communication device. Alternatively, the apparatus 30 can be the other communication device, where the interface 32 is configured to communicate with the communication device.

As shown in FIG. 3 the respective one or more interfaces 32 are coupled to the respective processing circuitry 34 at the apparatus 30. In examples the processing circuitry 34 may be implemented using one or more processing units, one or more processing devices, any method or mechanism for processing, such as a processor, a computer or a programmable hardware component being operable with accordingly adapted software. Similar, the described functions of the processing circuitry 34 may as well be implemented in software, which is then executed on one or more programmable hardware components. Such hardware components may comprise a general-purpose processor, a Digital Signal Processor (DSP), a micro-controller, etc. The processing circuitry 34 is capable of controlling the interface 32, so that any data transfer that occurs over the interface and/or any interaction in which the interface may be involved may be controlled by the processing circuitry 34.

In an exemplary embodiment, the apparatus 30 may comprise a memory and at least one processing circuitry 34 operably coupled to the memory and configured to perform the below mentioned method.

In examples the one or more interfaces 32 may correspond to any method or mechanism for obtaining, receiving, transmitting or providing analog or digital signals or information, e.g., any connector, contact, pin, register, input port, output port, conductor, lane, etc. which allows providing or obtaining a signal or information. An interface may be wireless or wireline and it may be configured to communicate, i.e., transmit or receive signals, information with further internal or external components. The one or more interfaces 32 may comprise further components to enable communication between transportation vehicles. Such components may include transceiver (transmitter and/or receiver) components, such as one or more Low-Noise Amplifiers (LNAs), one or more Power-Amplifiers (PAs), one or more duplexers, one or more diplexers, one or more filters or filter circuitry, one or more converters, one or more mixers, accordingly adapted radio frequency components, etc.

More details and facets are mentioned in connection with the embodiments described above. The example shown in FIG. 3 may comprise one or more optional additional features corresponding to one or more features mentioned in connection with the proposed concept or one or more examples described above (FIG. 1-2).

The facets and features described in relation to a particular one of the previous examples may also be combined with one or more of the further examples to replace an identical or similar feature of that further example or to additionally introduce the features into the further example.

Examples may be compliant to or even comprised in certain standard specifications, such as those specified by the 3GPP. Configuration information may, for example, be communicated using signaling radio bearers, e.g., by Radio Resource Control (RRC) messages, which are, for example, specified in the *.331 series of 3GPP as layer 3 control plane messages. For example, physical layer specification, e.g., by Doppler Delay Resolutions and other physical layer specifications may also be affected by present exemplary embodiments, e.g., *.201, *.211, *.212, *.213, *.214, *.216 series in the 3GPP specifications.

Examples may further be or relate to a (computer) program including a program code to execute one or more of the above methods when the program is executed on a computer, processor or other programmable hardware component. Thus, operations or processes of different ones of the methods described above may also be executed by programmed computers, processors or other programmable hardware components. Examples may also cover program storage devices, such as digital data storage media, which are machine-, processor- or computer-readable and encode and/or contain machine-executable, processor-executable or computer-executable programs and instructions. Program storage devices may include or be digital storage devices, magnetic storage media such as magnetic disks and magnetic tapes, hard disk drives, or optically readable digital data storage media, for example. Other examples may also include computers, processors, control units, (field) programmable logic arrays ((F)PLAs), (field) programmable gate arrays ((F)PGAs), graphics processor units (GPU), application-specific integrated circuits (ASICs), integrated circuits (ICs) or system-on-a-chip (SoCs) systems programmed to execute the operations of the methods described above.

It is further understood that the disclosure of several processes, operations or functions disclosed in the description or claims shall not be construed to imply that these operations are necessarily dependent on the order described, unless explicitly stated in the individual case or necessary for technical reasons. Therefore, the previous description does not limit the execution of several operations or functions to a certain order. Furthermore, in further examples, a single function, process or operation may include and/or be broken up into several sub-functions, -processes or -operations.

If some features have been described in relation to a device or system, these should also be understood as a description of the corresponding method. For example, a block, device or functional facet of the device or system may correspond to a feature, such as a method operation, of the corresponding method. Accordingly, features described in relation to a method shall also be understood as a description of a corresponding block, a corresponding element, a property or a functional feature of a corresponding device or a corresponding system.

If some features have been described in relation to a device or system, these should also be understood as a description of the corresponding method and vice versa. For example, a block, device or functional facets of the device or system may correspond to a feature, such as a method operation, of the corresponding method. Accordingly, features described in relation to a method shall also be understood as a description of a corresponding block, a corresponding element, a property or a functional feature of a corresponding device or a corresponding system.

The following claims are hereby incorporated in the detailed description, wherein each claim may stand on its own as a separate example. It should also be noted that although in the claims a dependent claim refers to a particular combination with one or more other claims, other examples may also include a combination of the dependent claim with the subject matter of any other dependent or independent claim. Such combinations are hereby explicitly proposed, unless it is stated in the individual case that a particular combination is not intended. Furthermore, features of a claim should also be included for any other independent claim, even if that claim is not directly defined as dependent on that other independent claim.

LIST OF REFERENCE SIGNS 30 apparatus
32 interface
34 processing circuitry
100 method for user equipment
110 obtaining map information
120 determining radio channel information
130 generating a node map
200 method for further user equipment
210 obtaining map information
220 receiving radio channel information
230 generating a node map

The invention claimed is:

1. An apparatus comprising:
one or more interfaces configured to communicate with a communication device or user equipment; and
processing circuitry to control the one or more interfaces to perform a method to improve position information of one or more communication devices for the user equipment, wherein the method includes:
obtaining map information about positions of the one or more communication devices;
determining radio channel information about the one or more communication devices by analyzing a radio channel, wherein the radio channel information is a spatial radio channel information belonging to an antenna system of the user equipment;
generating a node map comprising the improved position information of the one or more communication devices using the map information and the radio channel information; and
adjusting a transmission parameter to increase communication reliability of communication between the user equipment and the one or more communication devices as a result of improved reliability of the position information of the one or more communication devices in the node map.

2. A transportation vehicle comprising the apparatus of claim 1.

3. The apparatus of claim 1, wherein the generated node map is transmitted from the user equipment to further user equipment.

4. The apparatus of claim 1, wherein the radio channel information is transmitted from the user equipment to further user equipment.

5. The apparatus of claim 1, wherein the generated node map and/or the radio channel information is transmitted via broadcast message.

6. The apparatus of claim 1 wherein the radio channel information about the one or more communication devices is determined periodically, and the node map is generated periodically based on the periodically determined radio channel information.

7. The apparatus of claim 1, wherein further radio channel information is received from further user equipment, and the generated node map is edited by the one or more communication devices using the received further radio channel information.

8. The apparatus of claim 1, wherein radio channel information from an other radio channel are received from an other user equipment, and the node map that includes the one or more communication devices is edited using the other radio channel information.

9. The apparatus of claim 8, wherein a request for the radio channel information and/or the other radio channel information is transmitted.

10. The apparatus of claim 8, wherein the generated node map is transmitted to the user equipment and/or the other user equipment.

11. The apparatus of claim 8, wherein the generated node map, the radio channel information and/or the other radio channel information is transmitted by a broadcast message.

12. A method for user equipment to improve position information of one or more communication devices, the method comprising:
- obtaining map information about positions of the one or more communication devices;
- determining radio channel information about the one or more communication devices by analyzing a radio channel, wherein the radio channel information is a spatial radio channel information belonging to an antenna system of the user equipment;
- generating a node map comprising improved position information of the one or more communication devices using the map information and the radio channel information; and
- adjusting a transmission parameter to increase communication reliability of communication between the user equipment and the one or more communication devices as a result of improved reliability of the position information of the one or more communication devices in the node map.

13. The method of claim 12, further comprising transmitting the generated node map from the user equipment to further user equipment.

14. The method of claim 13, wherein the generated node map and/or the radio channel information is transmitted via broadcast message.

15. The method of claim 12, further comprising transmitting the radio channel information from the user equipment to further user equipment.

16. The method of claim 15, wherein the generated node map and/or the radio channel information is transmitted via broadcast message.

17. The method of claim 12, further comprising:
- determining the radio channel information about the one or more communication devices periodically; and
- determining the node map periodically based on the periodically determined radio channel information.

18. The method of claim 12, further comprising:
- receiving further radio channel information from further user equipment; and
- editing the generated node map by the one or more communication devices using the received further radio channel information.

19. A method for further user equipment to improve position information of one or more communication devices, the method comprising:
- obtaining map information about positions of the one or more communication devices;
- receiving radio channel information about the one or more communication devices from user equipment, wherein the radio channel information is a spatial radio channel information belonging to an antenna system of the user equipment;
- generating a node map that includes improved position information of the one or more communication devices using the map information and the radio channel information; and
- adjusting a transmission parameter to increase communication reliability of communication between the user equipment and the one or more communication devices as a result of improved reliability of the position information of the one or more communication devices in the node map.

20. The method of claim 19, further comprising:
- receiving an other radio channel information from an other user equipment; and
- editing the node map that includes the one or more communication devices using the other radio channel information.

21. The method of claim 20, further comprising transmitting a request for the radio channel information and/or the other radio channel information.

22. The method of claim 20, further comprising transmitting the generated node map to the user equipment and/or the other user equipment.

23. The method of claim 20, wherein the generated node map, the radio channel information and/or the other radio channel information is transmitted by a broadcast message.

24. A non-transitory computer readable medium including a computer program having a program code for performing the method of claim 12, when the computer program is executed on a computer, a processor, or a programmable hardware component.

* * * * *